United States Patent [19]

Ishiwata et al.

[11] Patent Number: 4,980,875
[45] Date of Patent: Dec. 25, 1990

[54] MAGNETO-OPTICAL DISK WITH PERPENDICULAR MAGNETIC ANISOTROPY FILM AND HIGH CORROSION-RESISTANT FILM

[75] Inventors: Nobuyuki Ishiwata; Chizuko Wakabayashi; Takayuki Matsumoto; Toshiyuki Okumura; Junichi Homma; Susumu Ito, all of Osaka, Japan

[73] Assignee: NEC Home Electronics Ltd., Osaka, Japan

[21] Appl. No.: 264,381

[22] Filed: Oct. 31, 1988

[30] Foreign Application Priority Data

Oct. 31, 1987 [JP] Japan ................................ 52-276784

[51] Int. Cl.$^5$ ............................ G11B 7/24; G11B 5/62
[52] U.S. Cl. .................................. 369/13; 369/275.2; 428/694; 360/131
[58] Field of Search ..................... 369/13; 360/59, 114, 360/131; 365/122; 428/694, 900

[56] References Cited

U.S. PATENT DOCUMENTS 4,680,742  7/1987  Yamada et al. ....................... 369/13
4,789,606  12/1988  Yamada et al. ...................... 428/694

Primary Examiner—Stuart S. Levy
Assistant Examiner—Hoa T. Nguyen
Attorney, Agent, or Firm—Cushman, Darby & Cushman

[57] ABSTRACT

A Magneto-Optical disk having a transparent substrate, a Magneto-Optical film formed on the transparent substrate and a high corrosion-resistant film laminated on the Magneto-Optical film. The Magneto-Optical film is made of a perpendicular magnetic anisotropy material, the corrosion-resistant film is made of a metal or metal alloy. A foundation protecting layer may be formed on the transparent substrate with the Magneto-Optical film and the corrosion resistant film formed thereon. The Magneto-Optical film may be a plurality of films laminated alternately with a plurality of corrosion-resistant films.

8 Claims, 2 Drawing Sheets

C/N DEVIATION AT 60°C, 90%

MAGNETO-OPTICAL DISK WITH PERPENDICULAR MAGNETIC ANISOTROPY FILM AND HIGH CORROSION-RESISTANT FILM

BACKGROUND OF THE INVENTION

This application is related to the copending application entitled "Corrosion Resistant Magnetic Film" filed by the same inventors based on Japanese Patent Application No. 276783/87 corresponding to U.S. Pat. application Ser. No. 264,694. The present invention relates to a Magneto-Optical disk in which information is written on magnetic thin films by optical modulation and the information is read out by means of optical modulation using a Magneto-Optical effect such as the magneto-optic Kerr effect, or the like.

Magneto-Optical disks have been used as recording media for optical high-density bulk erasable memories in various fields including as external memories for computers, optical disk files, etc.

In a Magneto-Optical disk a magnetic thin film having perpendicular magnetic anisotropy (that is a Magneto-Optical recording film which hereinafter referred to as a perpendicular magnetic anisotropy film) is formed on a transparent substrate by a thin-film forming technique such as a sputtering, a vacuum evaporation, or the like. Various studies have been done on the film structure of such Magneto-Optical disks.

In those studies, particularly as a method for forming perpendicular magnetic anisotropy films, polycrystalline thin films or the like have been variously examined. Such a material has however disadvantages in that production of material is difficult, large recording energy is required, noise due to crystal grain boundary cannot be disregarded, and so on. Therefore, thin films of amorphous alloys of rare-earth and transition metals, such as TbFe, TbFe, Co, GdTbFeCo, or the like, are the subject of material examination. These thin films are of amorphous alloys of rare-earth and transition metals. However, the rare-earth metals are very easily oxidized. Even if a film structure has a predetermined composition ratio at first, the oxidation of the rare-earth metal progresses as time passes so that the composition becomes rich in the transition metal. In the extreme case, the perpendicular magnetic anisotropy necessary to a high-density memory is lost, or even if the perpendicular magnetic anisotropy is not lost a change in coercive force Hc occurs.

Recently, such a medium structure has been therefore proposed as shown in FIG. 6, in which a foundation protecting layer 2 is formed between a transparent substrate 1 and a perpendicular magnetic anisotropy film 3. A protecting film 4 is formed on the perpendicular magnetic anisotropy film 3 so that the perpendicular magnetic anisotropy film 3 is interposed between the foundation protecting layer 2 and the protecting film 4 to thereby protect the perpendicular magnetic anisotropy film 3 from the front and rear surfaces thereof. A protecting resin layer 5 made of ultraviolet ray setting resin transparent acrylic resin, epoxy resin, or the like is further formed on the protecting film 4.

In the above conventional medium structure shown in FIG. 6, however, the protection of the perpendicular magnetic anisotropy film 3 by means of the protecting films 2 and 4 is not sufficient to prevent the perpendicular magnetic anisotropy film 3 from penetrating moisture and oxygen through the protecting films 2 and 4, so that the magnetic anisotropy film 3 is oxidized or corroded at its interfaces, so as to produce pin holes or generate of selective oxidation of the rare-earth metal only. As a result, there have been problems in that the characteristics of the disk media deteriorate so that the initial characteristics cannot be maintained owing the passage of time.

SUMMARY OF THE INVENTION

An object of the present invention is to provide a Magneto-Optical disk which is improved in humidity-resistance, in weather-resistance, and in corrosion-resistance and therefore has a prolonged life.

A feature of the present invention is that a perpendicular magnetic anisotropy film is laminated in combination with a high corrosion-resistant film.

When the perpendicular magnetic anisotropy film and the high corrosion-resistant film are laminated on each other, the corrosion-resistant of the perpendicular magnetic anisotropy film is supplementarily completed by means of the high corrosion-resistant film, so that the perpendicular magnetic anisotropy film is improved in humidity-resistance, in weather resistance, and in corrosion resistance. A film resistant to deterioration due to corrosion is formed.

DETAILED DESCRIPTION OF THE PREFERRED EMBODIMENT

Figure 1:
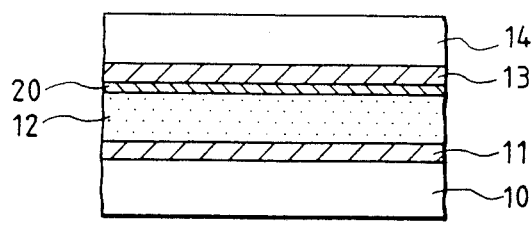
FIG. 1 is a sectional view showing an embodiment of the film structure of the Magneto-Optical disk according to the present invention.

Referring to the drawings, various embodiments of the Magneto-Optical disk according to the present invention will be described hereunder.

The Magneto-Optical disk has a structure in which a protecting film 11, a perpendicular magnetic anisotropy film 12, and a protecting film 13 are formed in order through sputtering to form a lamination on a transparent substrate 10 made of low grade PC (polycarbonate) of molecular weight of about 10,00-20,000, PMMA (polymethyl methacrylate), epoxy resin, or the like. A protecting resin layer 14 is formed on the top surface of the protecting film 13. The protecting layer 11 and the protecting film 13 are made $SiO_2$, $Y_2O_3$, or any suitable material. The protecting resin layer 14 is made of transparent acrylic resin, epoxy resin, or the like.

A thin film of an amorphous alloy of rare-earth and transition metals, such as TbFe, TbFeCo, GdTbFe, GdTbFeCo, or the like, is used as the perpendicular magnetic anisotropy layer 12.

The Magneto-Optical disk according to the present invention has a structure in which the perpendicular magnetic anisotropy film 12 of a single layer and a high corrosion-resistant film 20 of a single layer are laminated on each other. Alternatively, a plurality of the perpendicular magnetic anisotropy layers 12 and a plurality of the high corrosion-resistant layers 20 are alternatively laminated one on one. A film of an alloy such as NiFe (Permalloy), FeCo, FeRu, FePt, FeAl, or the like, or a film of transition metal such as Ni, Pt, or the like, may be used as the high corrosion-resistant film 20.

The thickness of the perpendicular magnetic anisotropy film 12 is set to about 1,000 Å. The thickness of the high corrosion-resistant film 20 is set to about 150 Å. These numerical values represent the respective thicknesses of the films when they have been laminated on each other. The total thickness including all layers is substantially constant. It is mainly the perpendicular magnetic anisotropy film 12 that actually functions as a Magneto-Optical recording film in information recording/reproducing operation, while the high corrosion-resistant film 20 is useful to improve the weather resistance, humidity resistance, and corrosion resistance of film 12.

Various film structures will be described specifically hereunder.

In a first embodiment depicted in FIG. 1, a single layer of perpendicular magnetic anisotropy film 12 and a single layer of high corrosion-resistant film 20 are laminated on each other in combination. The perpendicular magnetic anisotropy film 12 is formed on a transparent substrate 10 through a protecting film 11. The high corrosion-resistant film 20 is formed on the perpendicular magnetic anisotropy film 12, and a protecting film 13 and a protecting resin layer 14 are succeedingly formed in order on the high corrosion-resistant film 20. That is, in this embodiment, the perpendicular magnetic anisotropy film 12 is on the transparent substrate 10 side and the high corrosion-resistant film 20 is disposed on the side opposite to the substrate 10 through the perpendicular magnetic anisotropy film 12.

In this embodiment, the perpendicular magnetic anisotropy film 12 has a thickness of 1,000 Å and the high corrosion-resistant film 20 has a thickness of 50 Å so that the total thickness of the lamination of the films 12 and 20 is equal to the sum of the thicknesses of the respective films 12 and 20.

Figure 2:
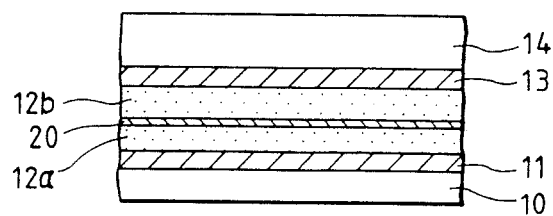
FIG. 2 is a sectional view showing a second embodiment of the film structure of the Magneto-Optical disk according to the present invention.

In a second embodiment depicted in FIG. 2, upper and lower perpendicular magnetic anisotropy films 12a and 12b are formed so as to sandwich a high corrosion-resistant film 20 therebetween. That is, the high corrosion-resistant film 20 is interposed between the perpendicular magnetic anisotropy films 13. In this film structure, the perpendicular magnetic anisotropy films 13 are alternately laminated one on one with the high corrosion-resistant film 20 sandwiched between the perpendicular magnetic anisotropy films 13.

To form the Magneto-Optical disk by sputtering, a protecting film 11 is first formed on a transparent substrate 10, and a first perpendicular magnetic anisotropy film 12a is formed on protecting film 11. The high corrosion-resistant film 20, and a second perpendicular magnetic anisotropy film 12b are succeedingly formed and laminated in order on the first perpendicular magnetic anisotrophy film 12a 11. After a protecting film 13 has been formed on the second perpendicular magnetic anisotropy film 12b, a protecting resin layer 14 is formed on the protecting film 13 in the succeeding step.

As an example of a method for carrying out this step, for example, a film forming technique called a spin coating method is employed in the case where the protecting resin layer 14 is made of ultraviolet ray setting resin.

In the second embodiment, the thickness of each of the first and second perpendicular magnetic anisotropy films 12a and 12b is set to a half of 1000 Å, that is, 500 Å. The thickness of the high corrosion-resistant film 20 is set to 50 Å, similar to that in the above embodiment.

Figure 3:
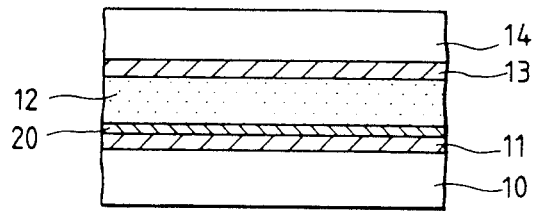
FIG. 3 is a sectional view showing a third embodiment of the film structure of the Magneto-Optical disk according to/the present invention.

In the third embodiment depicted in FIG. 3 a single layer of perpendicular magnetic anisotropy film 12 and a single layer of high corrosion-resistant film 20 are laminated on each other. The high corrosion-resistant film 20 is located on the transparent substrate 10 side and is formed on the transparent substrate 10 through a protecting film 11. The perpendicular magnetic anisotropy film 12 is thus formed and laminated on the transparent substrate 10 through the protecting film 11 and the high corrosion resistant film 20. A protecting film 13 and a protecting resin layer 14 are formed on the perpendicular magnetic anisotropy film 12 as described above.

In this embodiment, the thickness of the perpendicular magnetic anisotropy film 12 is set to 1000 Å and the thickness of the high corrosion-resistant film 20 is set to 50 Å.

Figure 4:
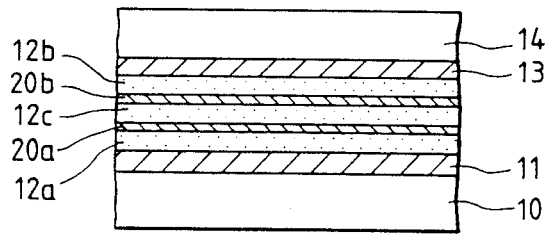
FIG. 4 is a sectional view showing a further embodiment of the film structure of the Magneto-Optical disk according to the present invention.

In a fourth embodiment depicted in FIG. 4, the perpendicular magnetic anisotropy film 12 and the high corrosion-resistant film 20 are constituted by three layers and two layers respectively. That is, perpendicular magnetic anisotropy films 12a and 12b, and 12c and high corrosion-resistant films 20a and 20b are alternately formed to form a lamination in which the two high corrosion-resistant films 20a and 20b are sandwiched among the three perpendicular magnetic anisotropy films 12a, 12b, and 12c. The central perpendicular magnetic anisotropy film 12c is sandwiched at its front and rear surfaces between the two high corrosion-resistant films 20a and 20b, and the two perpendicular magnetic anisotropy films 12a and 12b are formed on the outside of the two high corrosion-resistant films 20a and 20b respectively.

In the film forming process, a protecting layer 11 is first formed on a transparent substrate 10, and then the perpendicular magnetic anisotropy film 12a, the high corrosion-resistant film 20a, the perpendicular magnetic anisotropy film 12c, the high corrosion-resistant film 20b, and the perpendicular magnetic anisotropy film 12b are formed in order on the protecting layer 11 by sputtering while target materials are changed successively. After a protecting film 13 has been formed on the outside of perpendicular magnetic anisotropy film 12b, a protecting resin layer 14 is formed on the protecting film 13.

The three perpendicular magnetic anisotropy films 12a, 12b, and 12c are formed to be equal to each other in thickness. The thickness of each film is set to about one third of 1000 Å.

The thickness of each of the two high corrosion-resistant films 20a and 20b is equally set to 25 Å. The thickness can however be changed if necessary.

The disk medium shown in each of the first, second, third, and fourth embodiments described above can be formed through a thin-film forming technique such as an ion beam sputtering method, an RF magnetron sputtering method, a vacuum evaporation method, or the like. Of those methods, the ion beam sputtering method was employed in each of the above embodiments.

In that case, it is desirable to select the film-forming conditions such as argon gas pressure, sputtering power, target materials, etc., used in sputtering, to be optimum values. For example, an example of the optimum film-forming conditions is as follows.

Sputtering power: 300W

Used argon-gas pressure: $1 \times 10^{-2} - 10^{-7}$ Pa(pascal)

In the Magneto-Optical disk constituted with the film composition as described above, a single layer of perpendicular magnetic anisotropy film 12 and a single layer of high corrosion-resistant film 20 are laminated in combination one another, or a plurality of perpendicular magnetic anisotropy film 12 is supplementarily completed and remarkably improved by the high corrosion-resistant film 20. The initial characteristics can be maintained without being affected by moisture and/or oxygen for a long time.

Figure 5:
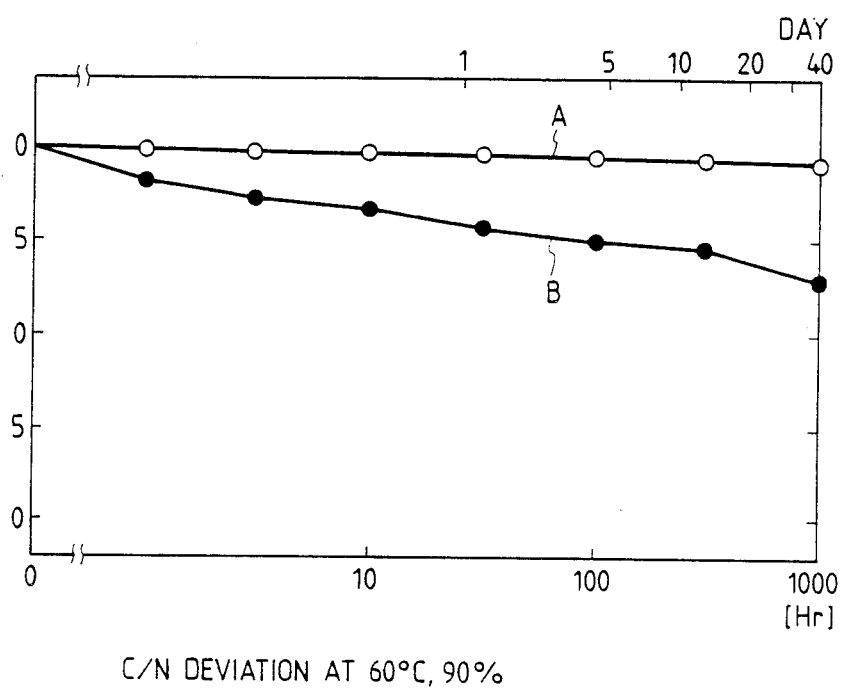
FIG. 5 is a graph diagram showing the result of a weather-resistance and corrosion-resistance test on the Magneto-Optical disk according to the present invention in comparison with the conventional disk medium.

FIG. 5 is a graph diagram showing the result of a weather- and corrosion-resistance test on the thus constituted Magneto-Optical disk according to the present invention. In the diagram, the abscissa represents a period of time during which a recording medium was left as it was in an atmosphere, and the ordinate represents a deviation of C/N(dB) from its initial value 0 (zero). In the diagram, graphs A and B show the characteristics of the Magneto-Optical disk according to the present invention and the conventional Magneto-Optical disk, respectively.

Figure 6:
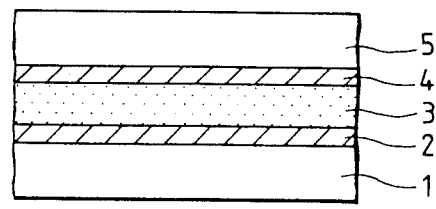
FIG. 6 is a sectional view showing a film structure of the conventional magneto-Optical disc.

In the case where the disk media as described above were left as they were in a chamber at a temperature of 60° C. and at relative humidity 90%, it was confirmed that, as being apparent in FIG. 6, the Magneto-Optical disk according to the present invention was maintained substantially in the initial state of C/N =0 even in the stage where the disk had been left as it was for more than 1,000 Hr (hours). The characteristics of the film did not substantially deteriorate over a long time even in the viewpoint of only noise level. The initial characteristics could be maintained for a long time even under the conditions of high temperature and high humidity. In the Magneto-Optical disk having the conventional film composition, on the contrary, it could be recognized that, as being apparent in the graph B, the value of C/N began to come down from the time when the disk was started and left as it was to reach a value considerably lowered from the initial value C/N =0 when the disk had been left as it was for 1,000 Hr (hours). This lowering was caused by oxidation and deterioration of the recording medium. It can be understood that the conventional recording medium becomes incapable of maintaining its initial characteristics in the stage where it has been left as it is for 1,000 hours so that it deteriorates to an extent to impede recording/reproducing operation, and that the conventional recording medium cannot be practically used as a Magneto-Optical disk.

According to the present invention, as is apparent from the above description, the perpendicular magnetic anisotropy film and the high corrosion-resistant film are mutually supplementarily completed so as to be remarkably improved in weather resistance add in the corrosion-resistance, so that a Magneto-Optical disk which is superior in weather resistance and in corrosion-resistance can be provided.

While the invention has been described in connection with what is presently considered to be the most practical and preferred embodiments, it is to be understood that the invention is not limited to the disclosed embodiments but, on the contrary is intended to cover various modifications and equivalent arrangements included within the spirit and scope of the appended claims.

What is claimed is:

1. A magneto-optical disk comprising:
    a transparent substrate;
    a magneto-optical recording film of perpendicular magnetic anisotropy material formed on said transparent substrate; and
    a high corrosion-resistant film having a predetermined thickness laminated to said magneto-optical recording film, said high corrosion-resistant film is made of a material selected from the group consisting of NiFe, FeCo, FeRu, FeAl and Ni.

2. A magneto-Optical disk according to claim 1, further comprising:
    a first protecting film formed between said transparent substrate and the laminated ISHIWATA et al--Appln. No. 07/264,381films of said perpendicular magnetic anisotropy film and said high corrosion-resistant film;
    a second protecting film formed on said laminated films of said perpendicular magnetic anisotropy film and said high corrosion-resistant film; and
    an upper protecting layer formed on said second protecting film so that said laminated films of said perpendicular magnetic anisotropy film and said high corrosion-resistant film are interposed between said upper protecting layer and said first protecting layer.

3. A Magneto-Optical disk according to claim 1, wherein said perpendicular magnetic anisotropy film comprises a single layer and said high corrosion-resistant film comprises a single layer.

4. A Magneto-Optical disk according to claim 1, wherein a plurality of said perpendicular magnetic anisotropy films and a plurality of said high corrosion-resistant films are alternately laminated one on the other.

5. A Magneto-Optical disk as in claim 2, wherein said foundation protecting layer is formed of a material selected from the group consisting of $SiO_2$ and $Y_2O_3$.

6. A Magneto-Optical disk as in claim 2, wherein said upper protecting layer is formed of a transparent acrylic resin.

7. A Magneto-Optical disk as in claim 2, wherein said upper protecting layer is formed of an epoxy resin.

8. A Magneto-Optical disk as in claim 2, wherein said perpendicular magnetic anisotropy film is formed of a material selected from the group consisting of TbFe, TbFeCo, GdTbFe and GdTbFeCo.

* * * * *